(12) United States Patent
Wang et al.

(10) Patent No.: US 6,978,604 B2
(45) Date of Patent: Dec. 27, 2005

(54) SOOT BURN-OFF CONTROL STRATEGY FOR A CATALYZED DIESEL PARTICULATE FILTER

(75) Inventors: Xinlei Wang, Champaign, IL (US); Xinqun Gui, Naperville, IL (US); Shouxian Ren, Aurora, IL (US); Guoqing Zhang, Lisle, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 33 days.

(21) Appl. No.: 10/703,062

(22) Filed: Nov. 6, 2003

(65) Prior Publication Data

US 2005/0097885 A1 May 12, 2005

(51) Int. Cl.[7] ................................................ F01N 3/00
(52) U.S. Cl. ............................ 60/297; 60/274; 60/295; 60/311
(58) Field of Search .......................... 60/274, 278, 280, 60/295, 297, 311

(56) References Cited

U.S. PATENT DOCUMENTS

| | | | | |
|---|---|---|---|---|
| 4,969,328 A | * | 11/1990 | Kammel | ...................... 60/275 |
| 5,319,930 A | * | 6/1994 | Shinzawa et al. | ............. 60/286 |
| 5,511,413 A | * | 4/1996 | Pfister et al. | .............. 73/118.1 |
| 6,367,246 B1 | * | 4/2002 | Hirota et al. | ................. 60/295 |
| 6,405,528 B1 | * | 6/2002 | Christen et al. | ............. 60/295 |
| 6,829,889 B2 | * | 12/2004 | Saito et al. | ................... 60/291 |
| 6,829,890 B2 | * | 12/2004 | Gui et al. | ..................... 60/295 |

* cited by examiner

Primary Examiner—Binh Q. Tran
(74) Attorney, Agent, or Firm—Dennis Kelly Sullivan; Susan L. Lukasik; Jeffrey P. Calfa

(57) ABSTRACT

A control system (FIG. 4) for controlling regeneration of a DPF comprises a favorable-condition-based control section (52), a regular control section (54), and a regeneration termination control section (56). Section (54) initiates regeneration when the actual soot loading of the DPF becomes sufficiently large to mandate initiation of regeneration. Section (52) initiates regeneration when the actual soot loading reaches an amount less than the amount at which section (54) mandates regeneration, provided that selected engine operating conditions disclose conditions favorable for regeneration. Section (56) terminates regeneration when soot loading is reduced to some minimum amount or when conditions for continuing regeneration become unfavorable. By burning trapped soot during favorable conditions, the mandatory regeneration is postponed. This can lower the average amount of trapped soot in the CDPF, thereby lowering the average back-pressure on the engine.

39 Claims, 2 Drawing Sheets

SOOT BURN-OFF CONTROL STRATEGY FOR A CATALYZED DIESEL PARTICULATE FILTER

FIELD OF THE INVENTION

This invention relates generally to diesel engines that have diesel particulate filters for treating exhaust gases passing through their exhaust systems. More particularly, the invention relates to engine systems and methods for controlling the burning of soot trapped by a catalyzed diesel particulate filter (CDPF).

BACKGROUND OF THE INVENTION

An exhaust system of a diesel engine that comprises a diesel particulate filter (DPF) is capable of physically trapping diesel particulate matter (DPM) in exhaust gas passing through the exhaust system from the engine. DPM includes soot or carbon, the soluble organic fraction (SOF), and ash (i.e. lube oil additives etc.). The trapping of those constituents by a DPF reduces the amount of DPM entering the atmosphere, preventing what is sometimes seen as black smoke billowing from a vehicle's exhaust pipe.

When a DPF is present in the exhaust system of a motor vehicle powered by a diesel engine, it is desirable to regenerate the DPF to remove trapped soot before the accumulation of soot begins to interfere with engine and vehicle performance. Regeneration can typically be performed however only when conditions are suitable for effectively burning the trapped soot without undesired side effects.

Conditions that are conducive to successfully regenerating a DPF may not be present in all geographic regions for one or more various reasons. In the absence of such conditions, use of a DPF may be restricted to warm climates and then only as a passive exhaust treatment device. Such limitations hinder a more widespread use that is obviously desirable in order to maximize the benefit of DPF technology in motor vehicles.

CDPF technology extends DPF technology by including a catalyst in association with a DPF. One known CDPF exhaust treatment system comprises an oxidation catalyst disposed upstream of the DPF. The oxidation catalyst oxidizes hydrocarbons (HC) to $CO_2$ and $H_2O$ and converts NO to $NO_2$. The $NO_2$ oxidizes carbon trapped in the DPF. While $O_2$ could be used to oxidize DPM, the high temperatures needed for oxidation make $O_2$ more difficult for treating diesel engine exhaust without the aid of still another catalyst such as cerium-oxide ($CeO_2$). The inclusion of a second catalyst separate from the DPF adds to the cost of the exhaust treatment system.

Another known CDPF exhaust treatment device, sometimes referred to as a Catalyzed Soot Filter (or CSF), comprises an additional $CeO_2$ catalyst in the DPF, eliminating the need for an upstream oxidation catalyst. This can reduce the overall size of a DPF and avoid the greater pressure drops present in a two-substrate DPF like the first type described above. In both types of DPF, the oxidation catalyst oxidizes hydrocarbons (HC) and converts NO to $NO_2$, with the $NO_2$ then being used to oxidize the trapped carbon.

The rate at which trapped carbon is oxidized to $CO_2$ is controlled not only by the concentration of $NO_2$ or $O_2$ but also by temperature. Specifically, there are three important temperature parameters for regeneration.

The first is the oxidation catalyst's "light off" temperature, below which catalyst activity is too low to oxidize HC. That temperature is typically around 180° C.–200° C.

The second controls the conversion of NO to $NO_2$. This NO conversion temperature spans a range of temperatures having both a lower bound and an upper bound, which are defined as the minimum temperature and the maximum temperature at which 40% or greater NO conversion is achieved. The conversion temperature window defined by those two bounds extends from approximately 250° C. to approximately 450° C.

The third temperature parameter is related to the rate at which carbon is oxidized in the filter. Reference sources in relevant literature call that temperature the "Balance Point Temperature" (or BPT). It is the temperature at which the rate of oxidation of particulate, also sometimes referred to as the rate of DPF regeneration, is equal to the rate of accumulation of particulate. The BPT is one of the parameters that is especially important in determining the ability of a DPF to enable a diesel engine to meet expected tailpipe emissions laws and/or regulations.

Typically, a diesel engine runs relatively lean and relatively cool compared to a gasoline engine. That factor makes natural achievement of BPT problematic. Therefore, a manufacturer of a DPF for a diesel engine should strive for a design that minimizes BPT, and a diesel engine manufacturer should strive to develop engine control strategies for raising the exhaust gas temperature to temperatures in excess of BPT whenever the amount of trapped particulates exceeds some threshold that has been predetermined in a suitably appropriate manner, such as by experimentation. Using an engine control to raise exhaust gas temperature in this way is called forced regeneration.

Control of fueling is important in forcing regeneration. A known electronic engine control system comprises a processor-based engine controller that processes data from various sources to develop control data for controlling certain functions of the engine, including the amount and the timing of engine fueling. A typical diesel engine that comprises fuel injectors for injecting fuel into the engine cylinders under control of an engine control system controls both the duration and the timing of each fuel injection to set both the amount and the timing of engine fueling. During an engine cycle, more than one injection of fuel into a cylinder may occur. Pilot injection that precedes a main injection and post-injection that follows a main injection are examples. Proper fueling for initiating CDPF regeneration can be accomplished by controlling injections such as these.

SUMMARY OF THE INVENTION

The present invention relates to engine systems and methods for regenerating a CDPF. Regeneration can be initiated by either of two distinct initiation strategies: a regular, or forced, strategy and a favorable condition strategy. Regeneration, once initiated by either initiation strategy, is terminated by a distinct termination strategy. Various parameters are used to initiate and terminate regeneration.

The invention can improve engine and vehicle performance because the favorable condition strategy can initiate burning of trapped soot before the trapped soot has accumulated to an extent that creates a pressure drop across the CDPF sufficiently large to invoke the regular, or forced, initiation strategy. By burning at least some trapped soot during favorable conditions, the mandatory regeneration that is initiated by the regular, or forced, initiation strategy is postponed. This capability can lower the average amount of trapped soot in the CDPF, thereby lowering the average back-pressure on the engine. Should favorable conditions cease, the termination strategy terminates regeneration, and if favorable conditions fail to return before the pressure drop across the CDPF becomes large enough to initiate forced regeneration, regeneration will be forced when the pressure drop does become large enough.

An advantage of the invention is that it uses data that is typically already available to the engine control system. Hence, the invention can be implemented in an engine control system by known programming and processing techniques.

Accordingly, one generic aspect of the present invention relates to a diesel engine comprising an exhaust system comprising a DPF that treats exhaust gas resulting from combustion of fuel in the engine, and a control system for controlling regeneration of the DPF.

The control system comprises a processor a) for repeatedly processing a first data value correlated with actual soot loading of the DPF and a second data value representing soot loading sufficient to mandate initiation of regeneration, b) for initiating regeneration when the processing of a) discloses that the actual soot loading is at least equal to the soot loading sufficient to mandate initiation of regeneration, c) for repeatedly processing the first data value and a third data value representing soot loading less than that represented by the second data value, d) for repeatedly processing a result of the processing of c) and other data values indicative of selected engine operating conditions, e) for initiating regeneration when a result of the processing of d) discloses both that the actual soot loading is at least equal to the soot loading represented by the third data value and that the selected engine operating conditions disclose conditions suitable for regeneration, f) for repeatedly processing data values for determining termination of regeneration, and g) for terminating regeneration when the processing of f) discloses that regeneration should be terminated.

Another generic aspect relates to a motor vehicle propelled by such an engine.

Still other generic aspects relate to a method for control of DPF regeneration and to a control system for regenerating a DPF.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
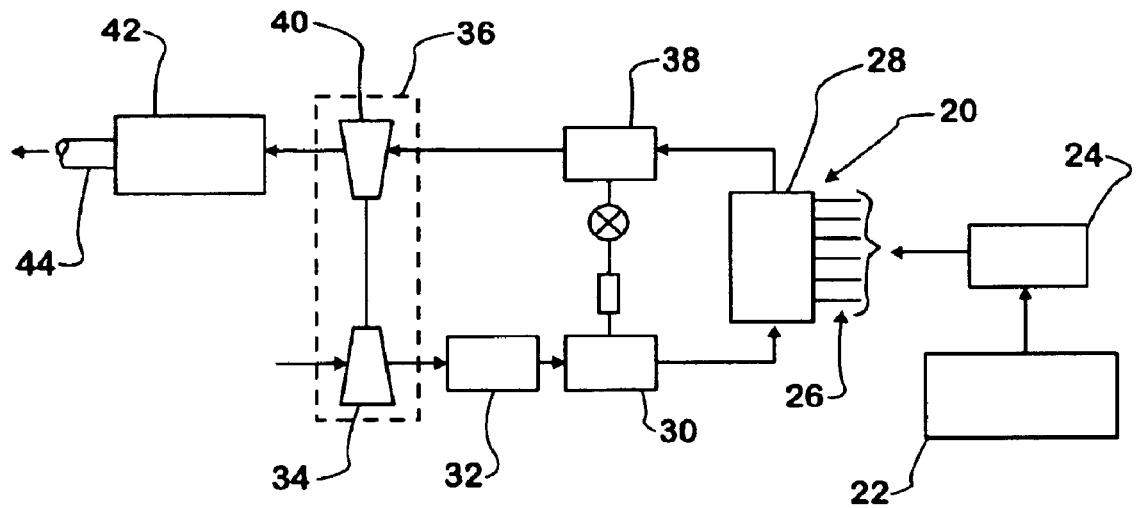
FIG. 1 is a general schematic diagram of an exemplary diesel engine having an electronic engine control system that includes the capability for initiating and terminating regeneration of a DPF in the exhaust system in accordance with principles of the present invention.

FIG. 1 shows a schematic diagram of an exemplary diesel engine 20 for powering a motor vehicle. Engine 20 has a processor-based engine control system 22 that processes data from various sources to develop various control data for controlling various aspects of engine operation. The data processed by control system 22 may originate at external sources, such as sensors, and/or be generated internally.

Control system 22 includes an injector driver module 24 for controlling the operation of electric-actuated fuel injectors 26 that inject fuel into combustion chambers in the engine cylinder block 28. A respective fuel injector 26 is associated with each cylinder and comprises a body that is mounted on the engine and has a nozzle through which fuel is injected into the corresponding engine cylinder. A processor of engine control system 22 can process data sufficiently fast to calculate, in real time, the timing and duration of injector actuation to set both the timing and the amount of fueling.

Engine 20 further comprises an intake system having an intake manifold 30 mounted on block 28. An intercooler 32 and a compressor 34 of a turbocharger 36 are upstream of manifold 30. Compressor 34 draws outside air and compresses it to create charge air that after having passed through intercooler 32 enters each engine cylinder from manifold 30 via a corresponding intake valve that opens and closes at proper times during engine cycles.

Engine 20 also comprises an exhaust system through which exhaust gases created by combustion within the engine cylinders can pass from the engine to atmosphere. The exhaust system comprises an exhaust manifold 38 mounted on block 28. Exhaust gases pass from each cylinder into manifold 38 via a respective exhaust valve that opens and closes at proper times during engine cycles.

Turbocharging of engine 20 is accomplished by turbocharger 36, which further comprises a turbine 40 that is associated with the exhaust system and coupled via a shaft to compressor 34. Hot exhaust gases acting on turbine 40 cause the turbine to operate compressor 34 to develop the charge air that provides boost for engine 20.

Figure 2:
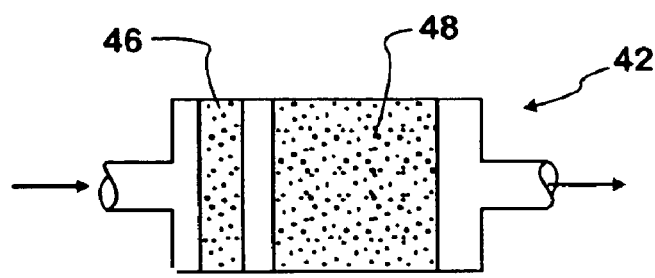
FIG. 2 is a semi-schematic drawing of one type of CDPF.

The exhaust system further comprises a CDPF 42 downstream of turbine 40 for treating exhaust gas before it passes into the atmosphere through an exhaust pipe 44. The CDPF shown in FIG. 2 is representative of the first type described earlier. It comprises an oxidation catalyst 46 disposed upstream of a non-catalyzed DPF 48. DPF 48 physically traps a high percentage of DPM in exhaust gas passing through it, preventing the trapped DPM from passing into the atmosphere. Oxidation catalyst 46 oxidizes hydrocarbons (HC) in the incoming exhaust gas to $CO_2$ and $H_2O$ and converts NO to $NO_2$. The $NO_2$ is then used to reduce the carbon particulates trapped in DPF 48.

Figure 3:
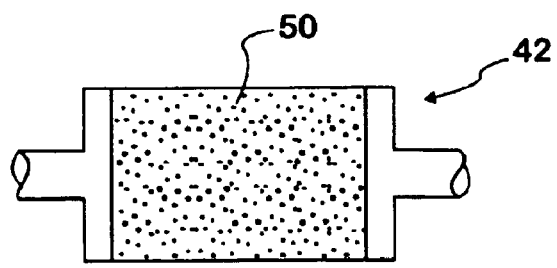
FIG. 3 is a semi-schematic drawing of another type of CDPF.

The CDPF shown in FIG. 3 is representative of the second type described earlier, having an additional $CeO_2$ catalyst that makes it less dependent on $NO_2$ for oxidizing trapped particulates. It has a single substrate 50 that combines an oxidation catalyst with a trap, thereby eliminating the need for a separate oxidation catalyst upstream of the DPF as shown in FIG. 2. As exhaust gases are passing through substrate 50, DPM is being trapped, and the oxidation catalyst is oxidizing hydrocarbons (HC) and converting NO to $NO_2$, with the $NO_2$ being used to oxidize the trapped carbon.

Figure 4:
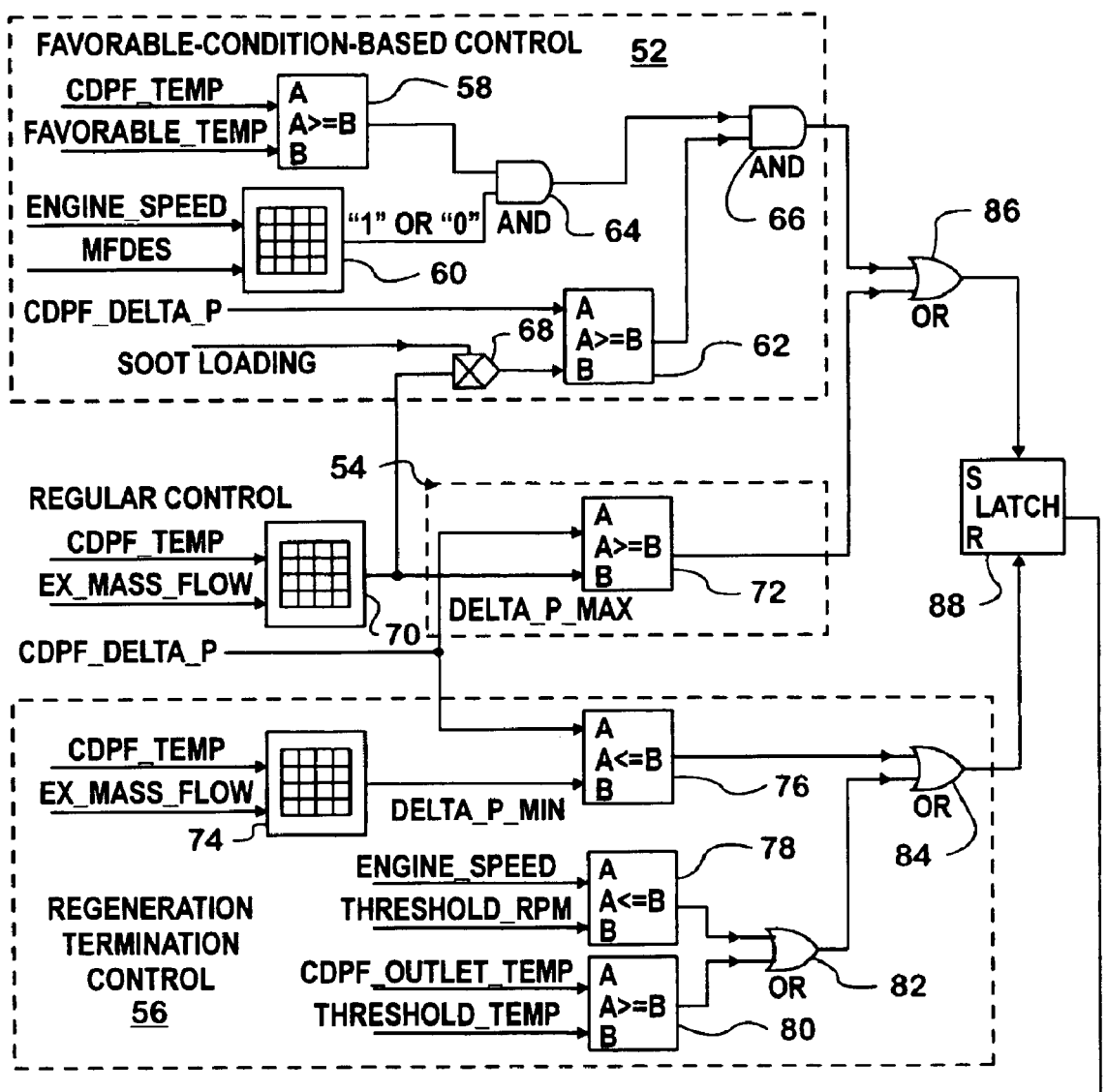
FIG. 4 is a software strategy diagram of an exemplary implementation of the inventive strategy in the engine control system.
Figure 4:
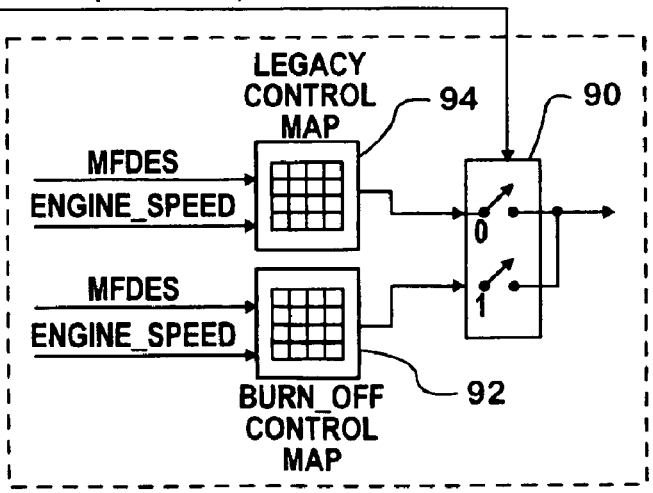

FIG. 4 shows an exemplary implementation of the inventive strategy in engine 20 for initiating and terminating regeneration of CDPF 42. Control system 22 executes the strategy by processing data and using the result of the processing to provide control over the regeneration process. The strategy is illustrated in the drawing by three distinct sections: 1) a favorable-condition-based control section 52, 2) a regular control section 54, and 3) a termination control section 56.

The strategy uses the following data parameters: CDPF_TEMP (representing the data value of actual CDPF temperature); FAVORABLE_TEMP (representing the data value of a minimum temperature of a range of CDPF temperatures over which regeneration is allowable); MFDES (representing the data value of desired engine fueling); CDPF_DELTA_P (representing the data value of actual pressure drop across the CDPF); SOOTLOADING (representing the data value of a programmable parameter for setting the pressure drop across the CDPF at which favorable-condition-based section 52 is enabled to initiate regeneration); EX_MASS_FLOW (representing the data value of exhaust mass flow through the CDPF); ENGINE_SPEED (representing the data value of actual engine speed); CDPF_OUTLET_TEMP (representing the data value of temperature at the outlet of the CDPF); THRESHOLD_RPM (representing the data value of engine speed at or below which regeneration will be terminated); THRESHOLD_TEMP (representing the data value of CDPF outlet temperature above which regeneration will be terminated).

Favorable-condition-based control section 52 comprises a comparison function 58, a map 60, another comparison function 62, and two AND logic functions 64, 66.

Data parameters CDPF_TEMP and FAVORABLE_TEMP are the two inputs to comparison function 58. Whenever the data value for CDPF_TEMP equals or exceeds that for FAVORABLE_TEMP, comparison function provides a logic "1" output. Otherwise, it provides a "0" logic output. A data value for CDPF_TEMP can be obtained in any suitably appropriate way, such as by averaging temperature data furnished by a sensor at the CDPF inlet and temperature data furnished by a sensor at the CDPF outlet.

Data parameters ENGINE_SPEED and MFDES are the two inputs to map 60. Map 60 uses data values for engine speed and desired fueling to select either a "0" logic value or a "1" logic value. Map 60 contains logic values "0" and "1", each of which correlates with a respective pair of data values, one for engine speed and one for desired engine fueling. Each data value for desired engine fueling represents a corresponding fractional span of a range of engine fueling while each data value for engine speed represents a corresponding fractional span of a range of engine speeds. For any given combination of desired engine fueling and engine speed, desired engine fueling will fall within one of its fractional spans in map 60, and engine speed within one of its fractional spans, causing the particular logic value, either a "0" or a "1", correlated with the two respective fractional spans to be supplied as the output of map 60.

Favorable-condition-based control 52 detects conditions that are favorable for initiating regeneration. The "favorable" means that the CDPF is still hot and the engine is operating at a condition with relatively high exhaust temperature. Under such conditions, it is 'favorable' to raise up the CDPF temperature in short time to initialize the regeneration by controlling the fueling, EGR and VNT (turbocharger). The data value for FAVORABLE_TEMP is set to be lower than, yet somewhat near, BPT, for example 480° F. The CDPF temperature represents the temperature history because of heat inertia of the CDPF. At any moment, when the CDPF temperature is greater than the FAVORABLE_TEMP, comparison function 58 will switch from providing a "0" output to providing a "1" output. That will satisfy one condition that is a prerequisite for actually initiating favorable-condition-based regeneration.

A second condition is determined by map 60. Data values for map 60 are obtained by steady state testing of engine 20 or an equivalent engine. The engine is run at each of a number of combinations of speed and fueling. For each combination, the running time is sufficiently long for exhaust gas temperature to stabilize. The stabilized temperature is then measured. If that temperature is sufficiently hot to allow its further increase with minimum fueling increase for regeneration to be initiated, then a "1" is entered in map 60 for the temperature and speed spans corresponding to that combination. If the temperature is not sufficiently hot, then a "0" is entered.

The outputs from comparison function 58 and map 60 are inputs to AND logic function 64. When CDPF_TEMP is at least equal to FAVORABLE_TEMP, and when engine speed and desired fueling are also favorable for initiating CDPF regeneration, AND logic function 64 provides a logic "1" output. By itself however, logic function 64 is incapable of initiating regeneration. The CDPF must itself evidence a need for regeneration, another prerequisite for favorable-condition-based regeneration to begin.

The pressure drop across the CDPF serves to indicate that need. Comparison function 62 compares the data value for CDPF_DELTA_P with the data value of a reference supplied by a multiplier function 68. Whenever the data value for CDPF_DELTA_P equals or exceeds the data value of the reference supplied by multiplier function 68, comparison function 62 provides a logic "1" output to indicate that the CDPF needs regeneration. Otherwise, it provides a "0" logic output. With both inputs to AND logic function 66 having logic values "1", regeneration is initiated, as will be more fully explained later.

The data value for the reference supplied by multiplier function 68 is determined by the data values for three parameters: SOOTLOADING, CDPF_TEMP, and EX_MASS_FLOW. Data values for the latter two parameters are inputs to a map 70 that is shared by sections 52, 54. Map 70 contains data values for a maximum allowable pressure drop across the CDPF designated by a parameter DELTA_P_MAX. Each data value for DELTA_P_MAX correlates with a respective pair of data values, one for actual CDPF temperature CDPF_TEMP and the other for actual exhaust mass flow EX_MASS_FLOW. Each data value for actual CDPF temperature represents a corresponding fractional span of a range of temperatures while each data value for EX_MASS_FLOW represents a corresponding fractional span of a range of actual exhaust mass flows. For any given combination of actual CDPF temperature and exhaust mass flow, actual CDPF temperature will fall within one of its fractional spans in map 70, and actual exhaust mass flow within one of its fractional spans, causing the particular data value of DELTA_P_MAX that is correlated with the two respective fractional spans in the map to be supplied as the map output.

Regular control section 54 comprises a comparison function 72 to which DELTA_P_MAX and CDPF_DELTA_P are the two inputs. Whenever the data value for CDPF_DELTA_P equals or exceeds that for DELTA_P_MAX, comparison function 72 provides a logic "1" output that, as will be more fully explained later, is effective to initiate regeneration. Otherwise, function 72 provides a "0" logic output.

Regeneration Termination Control Section comprises a map 74, three comparison functions 76, 78, 80, and two OR logic functions 82, 84.

Data parameters CDPF_TEMP, and EX_MASS_FLOW are the two inputs to map 74. Map 74 contains data values for pressure drop across the CDPF at and below which regeneration will be terminated (parameter DELTA_P_MIN). Each data value for DELTA_P_MIN correlates with a respective pair of data values, one for actual CDPF temperature CDPF_TEMP and the other for actual exhaust mass flow EX_MASS_FLOW. Each data value for actual CDPF temperature represents a corresponding fractional span of a range of temperatures while each data value for EX_MASS_FLOW represents a corresponding fractional span of a range of actual exhaust mass flows. For any given combination of actual CDPF temperature and exhaust mass flow, actual CDPF temperature will fall within one of its fractional spans in map 70, and actual exhaust mass flow within one of its fractional spans, causing the particular data value of DELTA_P_MIN correlated with the two respective fractional spans in the map to be supplied as the map output.

The data value of DELTA_P_MIN supplied by map 74 and the data value of CDPF_DELTA_P are the two inputs to comparison function 76. Whenever the data value for CDF_DELTA_P is equal to or less than that for DELTA_P_MIN, comparison function 76 provides a logic "1" output. Otherwise, it provides a "0" logic output.

The data value for ENGINE_SPEED and the data value for THRESHOLD_RPM are the two inputs to comparison function 78. Whenever the data value for ENGINE SPEED is equal to or less than that for THRESHOLD_RPM, comparison function 78 provides a logic "1" output. Otherwise, it provides a "0" logic output.

The data value for CDPF_OUTLET TEMP, obtained from the sensor at the CDPF outlet, and the data value for THRESHOLD_TEMP are the two inputs to comparison function 80. Whenever the data value for CDPF_OUTLET TEMP equals or exceeds that for THRESHOLD_TEMP, comparison function 80 provides a logic "1" output. Otherwise, it provides a "0" logic output.

The two OR logic functions 82, 84 are arranged such that a logic "1" output by any of comparison functions 76, 78, 80 will be effective to terminate regeneration. Hence, regeneration will be terminated by the occurrence of any of the following: CDPF_DELTA_P decreasing to a pressure set by DELTA_P_MIN based on CDPF temperature and exhaust mass flow; engine speed decreasing to a speed set by threshold_rpm; and CDPF outlet temperature increasing to a temperature set by threshold_temp. A decrease in CDPF_DELTA_P to pressure set by DELTA_P_MIN indicates that the pressure drop across the CDPF has been reduced sufficiently to preclude the need for further regeneration. A decrease in engine speed to speed set by threshold_rpm will discontinue regeneration if engine speed becomes too low for accomplishing effective regeneration. An increase in CDPF outlet temperature to temperature set by threshold_temp will discontinue regeneration if CDPF outlet temperature becomes indicative of a possible further increase that could damage the CDPF, and therefore THRESHOLD_TEMP is set to a value that will terminate regeneration before undesired temperatures are reached.

The outputs of AND logic function 66 and comparison function 72 are inputs to an OR logic function 86. A logic "1" output by either function 66, 72 will be effective to initiate regeneration. Once initiated, regeneration will continue until terminated by termination control section 74. This manner of control is accomplished through a latch function 88.

When a logic "1" is output by OR logic function 86, latch function 88 is set, provided that the output of OR logic function 84 is also not a logic "1". The setting of latch function 88 signals other sections of control system 22 that CDPF regeneration is to be performed. Those other sections typically include fueling control, EGR control, and turbocharger boost. Various functions within each control section are controlled in ways that collectively will be effective to initiate regeneration. For example, within a fueling control section, injection control pressure and the timing and widths of main and post-injection pulses may be controlled.

A switch function, such as switch function 90, is associated with each of the various control sections, such as fueling control, EGR control, and turbocharger boost. When latch function 88 is set, each of the switch functions, such as 90, causes the respective control section to utilize a burn-off control map, such as map 92. When latch function 88 is reset, each of the switch functions, such as 90, causes the respective control section to utilize a legacy control map, such as map 94. Each map 92, 94 utilizes engine speed and desired engine fueling as inputs.

Latch function 88 will remain set until reset by a logic "1" from OR logic function 84. The resetting of latch function 88 signals other sections of control system 22 that CDPF regeneration is to be terminated. The other sections that were being used to continue the regeneration process now revert to functioning in ways that will promptly terminate the process. So long as OR logic function 84 continues to hold latch function 88 reset, it will override the effect of any logic "1" from OR logic function 86. Hence, only until such time as the data values that form the inputs to termination section 56 allow it, regeneration cannot be re-initiated.

Regular control section 54 functions to initiate regeneration whenever CDPF_DELTA_P increases to a pressure set by DELTA_P_MAX based on CDPF temperature and exhaust mass flow. The data values for DELTA_P_MAX are set in map 70 to indicate pressures drops across the CDPF at which regeneration should be forced for particular combinations of CDPF temperature and exhaust mass flow. This is essentially forced regeneration based on soot loading of the CDPF having reached maximum allowable loading.

Favorable-condition-based control section 52 endows control system 22 with the ability to regenerate the CDPF before the soot loading reaches a point where regular control section 54 forces regeneration. But it does so only if certain conditions at which the engine is operating are favorable for initiating regeneration. CDPF temperature (the data value for CDPF_TEMP) must exceed a temperature set by the data value for FAVORABLE_TEMP, engine speed and engine fueling must meet certain criteria set by map 60, and the CDPF must evidence some need for regeneration, a need that is selectable by setting the data value for SOOTLOADING. A typical setting may be within a range from 40% to 60%.

Favorable-condition-based control section 52 initiates regeneration upon comparison functions 58, 62 and map 60 becoming effective to set latch function 88. The strategy causes the various control sections such as fueling control, EGR control, and turbocharger boost to now be controlled in ways that will elevate the exhaust temperature to temperatures exceeding BPT. Once regeneration has been initiated by control section 52, it can be terminated only by termination control section 56 because of the use of latch function 88 in the strategy.

The invention allows the favorable condition strategy to initiate burning of trapped soot before the trapped soot has accumulated to an extent that creates a pressure drop across the DPF sufficiently large to invoke the regular, or forced, initiation strategy. By burning at least some trapped soot during favorable conditions, the average amount of trapped soot in the DPF is reduced, thereby lowering the average back-pressure on the engine.

While a presently preferred embodiment of the invention has been illustrated and described, it should be appreciated that principles of the invention apply to all embodiments falling within the scope of the following claims.

What is claimed is:

1. A diesel engine comprising:
   an exhaust system comprising a DPF that treats exhaust gas resulting from combustion of fuel in the engine; and
   a control system for controlling regeneration of the DPF comprising a processor
   a) for repeatedly processing a first data value correlated with actual soot loading of the DPF and a second data value representing soot loading sufficient to mandate initiation of regeneration,
   b) for initiating regeneration when the processing of a) discloses that the actual soot loading is at least equal to the soot loading sufficient to mandate initiation of regeneration,
   c) for repeatedly processing the first data value and a third data value representing soot loading less than that represented by the second data value,
   d) for repeatedly processing a result of the processing of c) and other data values indicative of selected engine operating conditions,
   e) for initiating regeneration when a result of the processing of d) discloses both that the actual soot loading is at least equal to the soot loading represented by the third data value and that the selected engine operating conditions disclose conditions suitable for regeneration,
   f) for repeatedly processing data values for determining termination of regeneration, and
   g) for terminating regeneration when the processing of f) discloses that regeneration should be terminated.

2. An engine as set forth in claim 1 in which the control system comprises a latch function
   that is set when the processing of the first data value and the second data value discloses that the actual soot loading is at least equal to the soot loading sufficient to mandate initiation of regeneration,
   that is set when the processing of result of the processing of d) discloses both that the actual soot loading is at least equal to the soot loading represented by the third data value and that the selected engine operating conditions disclose conditions suitable for regeneration, and
   that is reset when the processing of data values for determining termination of regeneration discloses that regeneration should be terminated.

3. An engine as set forth in claim 2 in which the latch function is incapable of being set while continued processing of data values for determining termination of regeneration continues to disclose that regeneration should be terminated.

4. An engine as set forth in claim 1 in which the control system comprises a map containing data values for a maximum allowable pressure drop across the DPF, each correlated with a respective pair of data values for DPF temperature and exhaust mass flow, and the processing of a) processes a data value for actual DPF temperature, a data value for actual exhaust mass flow to select the corresponding maximum allowable pressure drop from the map as the second data value.

5. An engine as set forth in claim 4 in which the processing of c) processes the data value for the corresponding maximum allowable pressure drop selected from the map and a multiplier to yield the third data value.

6. An engine as set forth in claim 5 in which the processing of d) processes a data value for actual DPF temperature as one of the other data values indicative of selected engine operating conditions.

7. An engine as set forth in claim 6 in which the processing of d) also processes a data value for desired engine fueling and a data value for engine speed as two of the other data values indicative of selected engine operating conditions.

8. An engine as set forth in claim 7 in which the processing of a data value for desired engine fueling and a data value for engine speed as two of the other data values indicative of selected engine operating conditions comprises:
   processing the data value for desired engine fueling and the data value for engine speed according to a map for yielding a data value indicating exhaust temperature that is either favorable or unfavorable for initiating regeneration.

9. An engine as set forth in claim 1 in which the processing of d) processes a data value for desired engine fueling, a data value for engine speed, and a data value for actual DPF temperature as three of the other data values indicative of selected engine operating conditions.

10. An engine as set forth in claim 1 in which the processing of a) processes a data value for actual DPF temperature and a data value for actual exhaust mass flow to yield the second data value, and processes a data value for actual pressure drop across the DPF as the first data value.

11. An engine as set forth in claim 1 in which the processing of f) processes a data value for actual DPF temperature, a data value for actual exhaust mass flow, a data value for actual pressure drop across the DPF, and a data value for actual engine speed as data values for determining termination of regeneration.

12. An engine as set forth in claim 1 in which the processing of f) processes a data value for actual DPF temperature, a data value for actual exhaust mass flow, a data value for actual pressure drop across the DPF, and a data value indicative of actual temperature at the outlet of the DPF as data values for determining termination of regeneration.

13. A motor vehicle comprising:
   a diesel engine for propelling the vehicle;
   an exhaust system comprising a DPF for treating exhaust gas resulting from combustion of fuel in the engine; and
   an engine control system, including a processing system for processing data, for controlling various aspects of engine operation, including control of regeneration of the DPF;
   wherein the processing system operates
   a) to repeatedly process a first data value correlated with actual soot loading of the DPF and a second data value representing soot loading sufficient to mandate initiation of regeneration,
   b) to initiate regeneration when the processing of a) discloses that the actual soot loading is at least equal to the soot loading sufficient to mandate initiation of regeneration, c) to repeatedly process the first data value and a third data value representing soot loading less than that represented by the second data value, d) to repeatedly process a result of the processing of c) and other data values indicative of selected operating conditions, e) to initiate regeneration when a result of the processing of d) discloses both that the actual soot loading is at least equal to the soot loading represented by the third data value and that the selected operating conditions disclose conditions suitable for regeneration, f) to repeatedly process data values for determining termination of regeneration, and g) to terminate regeneration when the processing of f) discloses that regeneration should be terminated.

14. A motor vehicle as set forth in claim 13 in which the control system comprises a latch function that is set when the processing of the first data value and the second data value discloses that the actual soot loading is at least equal to the soot loading sufficient to mandate initiation of regeneration, that is set when the processing of result of the processing of d) discloses both that the actual soot loading is at least equal to the soot loading represented by the third data value and that the selected operating conditions disclose conditions suitable for regeneration, and that is reset when the processing of data values for determining termination of regeneration discloses that regeneration should be terminated.

15. A motor vehicle as set forth in claim 14 in which the latch function is incapable of being set while continued processing of data values for determining termination of regeneration continues to disclose that regeneration should be terminated.

16. A motor vehicle as set forth in claim 13 in which the control system comprises a map containing data values for a maximum allowable pressure drop across the DPF, each correlated with a respective pair of data values for DPF temperature and exhaust mass flow, and the processing of a) processes a data value for actual DPF temperature, a data value for actual exhaust mass flow to select the corresponding maximum allowable pressure drop from the map as the second data value.

17. A motor vehicle as set forth in claim 16 in which the processing of c) processes the data value for the corresponding maximum allowable pressure drop selected from the map and a multiplier to yield the third data value.

18. A motor vehicle as set forth in claim 13 in which the processing of d) processes a data value for desired engine fueling, a data value for actual engine speed, and a data value for actual DPF temperature as three of the other data values indicative of selected operating conditions.

19. A motor vehicle as set forth in claim 13 in which the processing of a) processes a data value for actual DPF temperature and a data value for actual exhaust mass flow to yield the second data value, and processes a data value for actual pressure drop across the DPF as the first data value.

20. A motor vehicle as set forth in claim 13 in which the processing of f) processes a data value for actual DPF temperature, a data value for actual exhaust mass flow, a data value for actual pressure drop across the DPF, and a data value for actual engine speed as data values for determining termination of regeneration.

21. A motor vehicle as set forth in claim 13 in which the processing of f) processes a data value for actual DPF temperature, a data value for actual exhaust mass flow, a data value for actual pressure drop across the DPF, and a data value indicative of actual temperature at the outlet of the DPF as data values for determining termination of regeneration.

22. A method for controlling regeneration of a DPF in an exhaust system of a diesel engine, the method comprising:

a) repeatedly processing a first data value correlated with actual soot loading of the DPF and a second data value representing soot loading sufficient to mandate initiation of regeneration, b) initiating regeneration when the processing of a) discloses that the actual soot loading is at least equal to the soot loading sufficient to mandate initiation of regeneration, c) repeatedly processing the first data value and a third data value representing soot loading less than that represented by the second data value, d) repeatedly processing a result of the processing of c) and other data values indicative of selected engine operating conditions, e) initiating regeneration when a result of the processing of d) discloses both that the actual soot loading is at least equal to the soot loading represented by the third data value and that the selected engine operating conditions disclose conditions suitable for regeneration, f) repeatedly processing data values for determining termination of regeneration, and g) terminating regeneration when the processing of f) discloses that regeneration should be terminated.

23. A method as set forth in claim 22 further comprising:

setting a latch function when the processing of the first data value and the second data value discloses that the actual soot loading is at least equal to the soot loading sufficient to mandate initiation of regeneration, setting the latch function when the processing of result of the processing of d) discloses both that the actual soot loading is at least equal to the soot loading represented by the third data value and that the selected engine operating conditions disclose conditions suitable for regeneration, and resetting the latch function when the processing of data values for determining termination of regeneration discloses that regeneration should be terminated.

24. A method as set forth in claim 23 further comprising:

forcing the latch function to remain reset so long as continued processing of data values for determining termination of regeneration continues to disclose that regeneration should be terminated.

25. A method as set forth in claim 22 further comprising:

processing a data value for actual DPF temperature and a data value for actual exhaust mass flow according to a map containing data values for a maximum allowable pressure drop across the DPF, each correlated with a respective pair of data values for DPF temperature and exhaust mass flow, to select the corresponding maximum allowable pressure drop from the map as the second data value.

26. A method as set forth in claim 25 in which the processing of c) comprises processing the data value for the corresponding maximum allowable pressure drop selected from the map and a multiplier to yield the third data value.

27. A method as set forth in claim 26 in which the processing of d) comprises processing a data value for actual DPF temperature as one of the other data values indicative of selected engine operating conditions.

28. A method as set forth in claim 27 in which the processing of d) also comprises processing a data value for desired engine fueling and a data value for engine speed as two of the other data values indicative of selected engine operating conditions.

29. A method as set forth in claim 26 in which the processing of a data value for desired engine fueling and a data value for engine speed as two of the other data values indicative of selected engine operating conditions comprises:

processing the data value for desired engine fueling and the data value for engine speed according to a map for yielding a data value indicating exhaust temperature that is either favorable or unfavorable for initiating regeneration.

30. A method as set forth in claim 22 in which the processing of d) comprises processing a data value for desired engine fueling, a data value for engine speed, and a data value for actual DPF temperature as three of the other data values indicative of selected engine operating conditions.

31. A method as set forth in claim 22 in which the processing of a) comprises processing a data value for actual DPF temperature and a data value for actual exhaust mass flow to yield the second data value, and processing a data value for actual pressure drop across the DPF as the first data value.

32. A method as set forth in claim 22 in which the processing of f) comprises processing a data value for actual DPF temperature, a data value for actual exhaust mass flow, a data value for actual pressure drop across the DPF, and a data value for actual engine speed as data values for determining termination of regeneration.

33. A method as set forth in claim 22 in which the processing of f) comprises processing a data value for actual DPF temperature, a data value for actual exhaust mass flow, a data value for actual pressure drop across the DPF, and a data value indicative of actual temperature at the outlet of the DPF as data values for determining termination of regeneration.

34. A control system for regenerating a DPF that treats exhaust gas resulting from combustion of fuel in an internal combustion engine, the control system comprising a processor: a) for repeatedly processing a first data value correlated with actual soot loading of the DPF and a second data value representing soot loading sufficient to mandate initiation of regeneration: b) for initiating regeneration when the processing of a) discloses that the actual soot loading is at least equal to the soot loading sufficient to mandate initiation of regeneration; c) for repeatedly processing the first data value and a third data value representing soot loading less than that represented by the second data value; d) for repeatedly processing a result of the processing of c) and other data values indicative of selected engine operating conditions; e) for initiating regeneration when a result of the processing of d) discloses both that the actual soot loading is at least equal to the soot loading represented by the third data value and that the selected engine operating conditions disclose conditions suitable for regeneration; f) for repeatedly processing data values for determining termination of regeneration; and g) for terminating regeneration when the processing of f) discloses that regeneration should be terminated.

35. A control system as set forth in claim 34 further comprising a latch function that is set when the processing of the first data value and the second data value discloses that the actual soot loading is at least equal to the soot loading sufficient to mandate initiation of regeneration, that is set when the processing of result of the processing of d) discloses both that the actual soot loading is at least equal to the soot loading represented by the third data value and that the selected engine operating conditions disclose conditions suitable for regeneration, and that is reset when the processing of data values for determining termination of regeneration discloses that regeneration should be terminated.

36. A control system as set forth in claim 35 in which the latch function is incapable of being set while continued processing of data values for determining termination of regeneration continues to disclose that regeneration should be terminated.

37. A control system as set forth in claim 35 further comprising control sections that are controlled in respective ways for initiating and terminating regeneration, and for each control section, a respective switch function controlled by the latch function for causing the respective control section to utilize a respective first control map for initiating regeneration and a respective second control map for terminating regeneration.

38. A control system as set forth in claim 37 in which the control sections include a fueling control section, an EGR control section, and a turbocharger control section.

39. A control system as set forth in claim 37 in which each respective first control map and each respective control map utilizes desired engine fueling and engine speed as inputs.

* * * * *